United States Patent
Suga et al.

(10) Patent No.: US 9,962,908 B2
(45) Date of Patent: May 8, 2018

(54) METHOD FOR BONDING POLYMER FILM AND POLYMER FILM, METHOD FOR BONDING POLYMER FILM AND INORGANIC MATERIAL SUBSTRATE, POLYMER FILM LAMINATE, AND LAMINATE OF POLYMER FILM AND INORGANIC MATERIAL SUBSTRATE

(71) Applicants: Tadatomo Suga, Nakano-ku (JP); LAN TECHNICAL SERVICE CO., LTD., Shinjuku-ku (JP)

(72) Inventors: Tadatomo Suga, Nakano-ku (JP); Yoshiie Matsumoto, Shinjuku-ku (JP)

(73) Assignee: LAN TECHNICAL SERVICE CO., LTD., Shinjuku-ku (JP)

( * ) Notice: Subject to any disclaimer, the term of this patent is extended or adjusted under 35 U.S.C. 154(b) by 691 days.

(21) Appl. No.: 14/391,568

(22) PCT Filed: Apr. 9, 2013

(86) PCT No.: PCT/JP2013/060732
§ 371 (c)(1),
(2) Date: Oct. 9, 2014

(87) PCT Pub. No.: WO2013/154107
PCT Pub. Date: Oct. 17, 2013

(65) Prior Publication Data
US 2015/0104656 A1    Apr. 16, 2015

(30) Foreign Application Priority Data
Apr. 10, 2012    (JP) ................ 2012-089260

(51) Int. Cl.
*B32B 15/08*    (2006.01)
*B29C 65/14*    (2006.01)
(Continued)

(52) U.S. Cl.
CPC .............. *B32B 15/08* (2013.01); *B29C 59/14* (2013.01); *B29C 65/1432* (2013.01);
(Continued)

(58) Field of Classification Search
CPC ......... B32B 15/08; B29C 59/14; B29C 65/14; B29C 65/1432; B29C 65/1467;
(Continued)

(56) References Cited

U.S. PATENT DOCUMENTS 5,924,197 A    7/1999 Murakami et al.
2004/0038050 A1    2/2004 Saijo et al.
(Continued)

FOREIGN PATENT DOCUMENTS

CN    1727179 A    2/2006
CN    101491963 A    7/2009
(Continued)

OTHER PUBLICATIONS

European Search Report dated Jan. 16, 2016, in corresponding European Patent Application No. 13 77 6372.
(Continued)

*Primary Examiner* — Daniel McNally
(74) *Attorney, Agent, or Firm* — Oblon, McClelland, Maier & Neustadt, L.L.P.

(57) ABSTRACT

The present invention provides a method for firmly and inexpensively bonding at low temperature a polymer film to another polymer film or to a glass substrate without the use of an organic adhesive. A method for bonding a polymer film includes a step (S1) for forming a first inorganic material layer on part or all of a first polymer film; a step (S3) for forming a second inorganic material layer on part or all of a second polymer film; a step (S2) for surface-activating the surface of the first inorganic material layer by bombarding with particles having a predetermined kinetic energy; a step
(Continued)

(S4) for surface-activating the surface of the second inorganic material layer by bombarding with particles having a predetermined kinetic energy; and a step (S5) for abutting the surface-activated surface of the first inorganic material layer against the surface-activated surface of the second inorganic material layer and bonding the first polymer film and second polymer film together.

19 Claims, 7 Drawing Sheets

(51) Int. Cl.
```
B29C 65/00      (2006.01)
C08J 5/12       (2006.01)
B29C 59/14      (2006.01)
B32B 15/09      (2006.01)
B32B 27/28      (2006.01)
B32B 27/36      (2006.01)
B32B 37/24      (2006.01)
B32B 38/00      (2006.01)
B32B 27/08      (2006.01)
B32B 17/06      (2006.01)
B32B 37/18      (2006.01)
B32B 37/20      (2006.01)
B32B 37/02      (2006.01)
B32B 37/00      (2006.01)
```
(52) U.S. Cl.
CPC ........ *B29C 65/1467* (2013.01); *B29C 66/028* (2013.01); *B29C 66/1122* (2013.01); *B29C 66/45* (2013.01); *B29C 66/72321* (2013.01); *B29C 66/72325* (2013.01); *B29C 66/7373* (2013.01); *B29C 66/74* (2013.01); *B29C 66/8221* (2013.01); *B29C 66/83241* (2013.01); *B29C 66/83413* (2013.01); *B32B 15/09* (2013.01); *B32B 17/064* (2013.01); *B32B 27/08* (2013.01); *B32B 27/281* (2013.01); *B32B 27/36* (2013.01); *B32B 37/24* (2013.01); *B32B 38/00* (2013.01); *C08J 5/12* (2013.01); *B29C 66/71* (2013.01); *B29C 66/712* (2013.01); *B29C 66/72326* (2013.01); *B29C 66/7392* (2013.01); *B29C 66/7394* (2013.01); *B29C 66/73921* (2013.01); *B29C 66/73941* (2013.01); *B29C 66/7461* (2013.01); *B29C 66/7465* (2013.01); *B29C 66/74611* (2013.01); *B32B 37/0076* (2013.01); *B32B 37/02* (2013.01); *B32B 37/182* (2013.01); *B32B 37/203* (2013.01); *B32B 2037/0092* (2013.01); *B32B 2037/243* (2013.01); *B32B 2250/03* (2013.01); *B32B 2255/10* (2013.01); *B32B 2255/20* (2013.01); *B32B 2255/205* (2013.01); *B32B 2307/546* (2013.01); *B32B 2309/68* (2013.01); *B32B 2310/0881* (2013.01); *B32B 2457/20* (2013.01); *B32B 2457/206* (2013.01); *Y10T 156/10* (2015.01); *Y10T 428/31681* (2015.04)

(58) Field of Classification Search
CPC ... B29C 66/028; B29C 66/1122; B29C 66/45; B29C 66/72321; B29C 66/72325; B29C 66/7373; B29C 66/74; B29C 66/8221; B29C 66/32241; B29C 66/83241; B29C 66/83413

See application file for complete search history.

(56) References Cited

U.S. PATENT DOCUMENTS

| | | | |
|---|---|---|---|
| 2007/0072391 A1* | 3/2007 | Pocas | H01L 21/187 |
| | | | 438/455 |
| 2007/0128825 A1 | 6/2007 | Suga et al. | |
| 2008/0041517 A1* | 2/2008 | Moriceau | H01L 24/83 |
| | | | 156/182 |
| 2009/0186242 A1 | 7/2009 | Sato et al. | |
| 2010/0092786 A1* | 4/2010 | Utsumi | B23K 20/02 |
| | | | 428/433 |
| 2014/0037945 A1 | 2/2014 | Suga et al. | |

FOREIGN PATENT DOCUMENTS

| | | |
|---|---|---|
| EP | 1 332 867 | 8/2003 |
| JP | 9 226135 | 9/1997 |
| JP | 2004 141918 | 5/2004 |
| JP | 2004 223637 | 8/2004 |
| JP | 2004 337927 | 12/2004 |
| JP | 2008 150550 | 7/2008 |
| JP | 2010 120088 | 6/2010 |
| WO | 2008 090701 | 7/2008 |
| WO | 2012 105474 | 8/2012 |

OTHER PUBLICATIONS

Tadatomo Suga et al., "Direct Bonding of Polymer to Glass Wafers Using Surface Activated Bonding (SAB) Method at Room Temperature," *LTB-3D*, Tokyo, May 22, 2012, p. 161.

T. Matsumae, et al., "Room Temperature Bonding of Polymer to Glass Wafer Using Surface Activated Bonding (SAB) Method", *ECS Transactions*, vol. 50, No. 7, Mar. 15, 2013, pp. 297-302.

Tadatomo Suga, "Sticking on Contact? The World of Ambient Temperature Bonding", Chemistry Today, Total 14 Pages, (Jul. 1998) (with English translation).

International Search Report dated Jul. 16, 2013 in PCT/JP13/080732 Filed Apr. 9, 2013.

* cited by examiner

[FIG. 1]
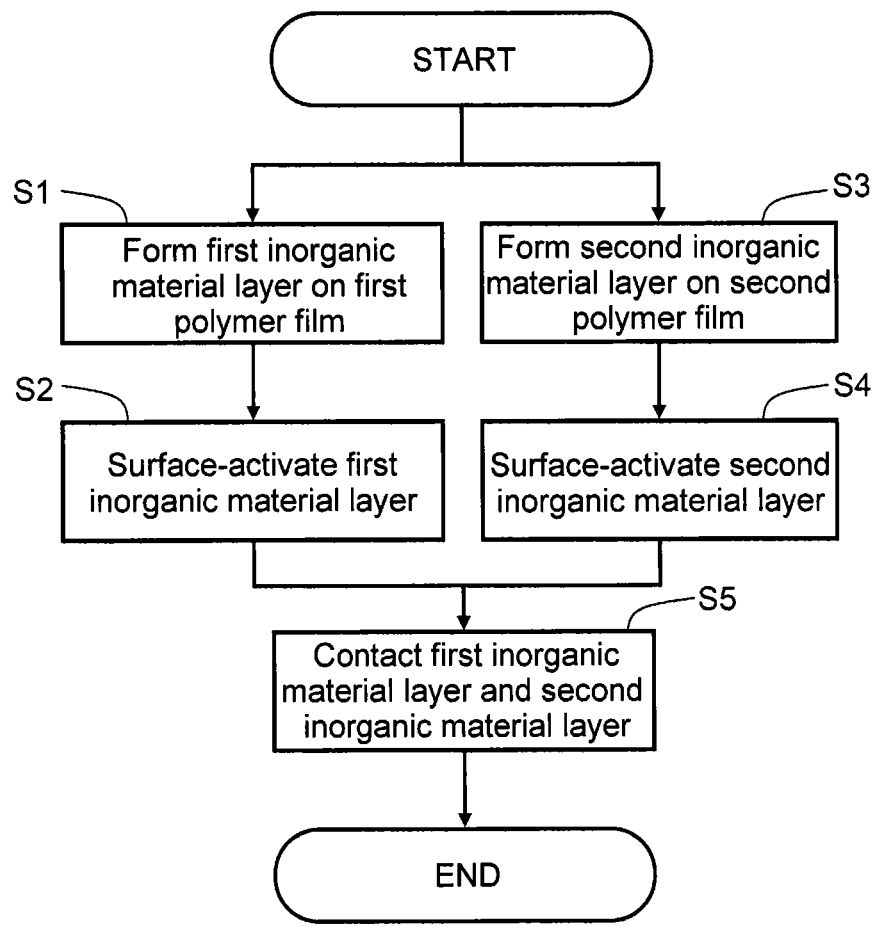

[FIG. 2]
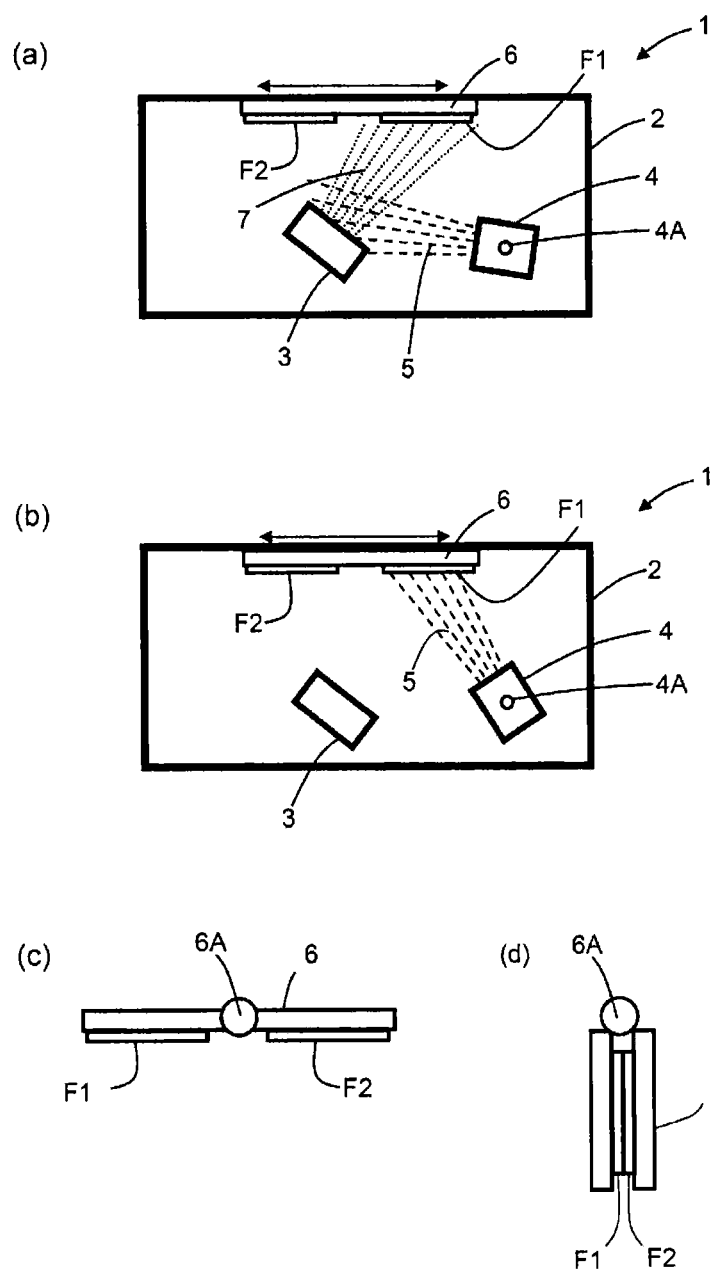

[FIG. 3]
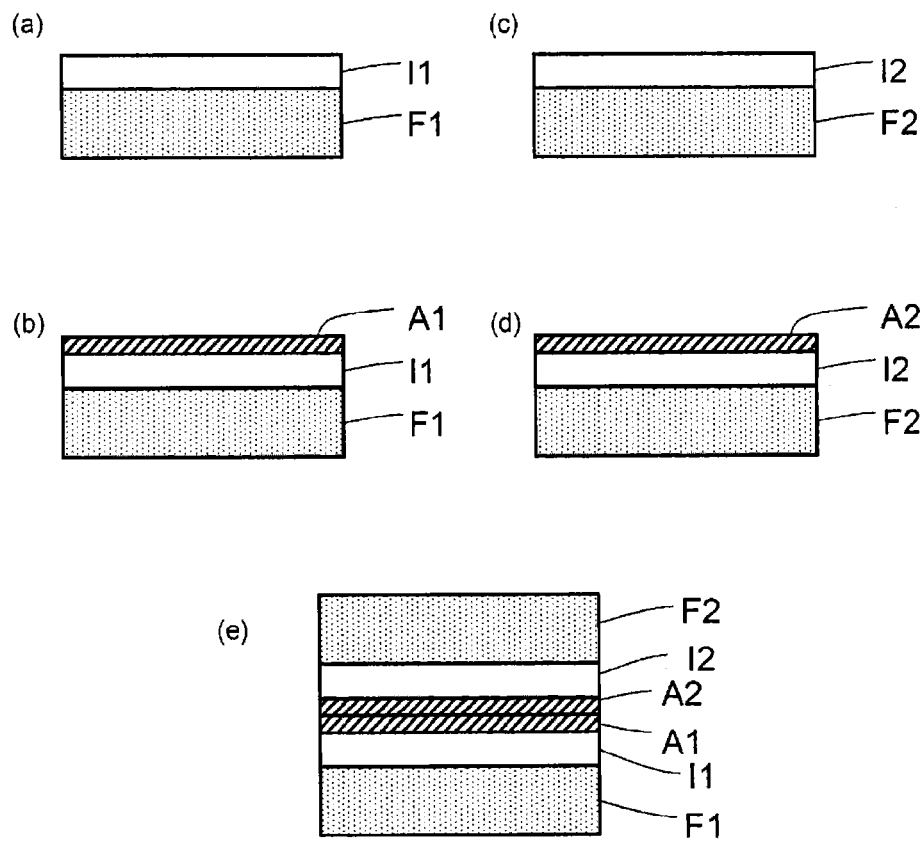

[FIG. 4]
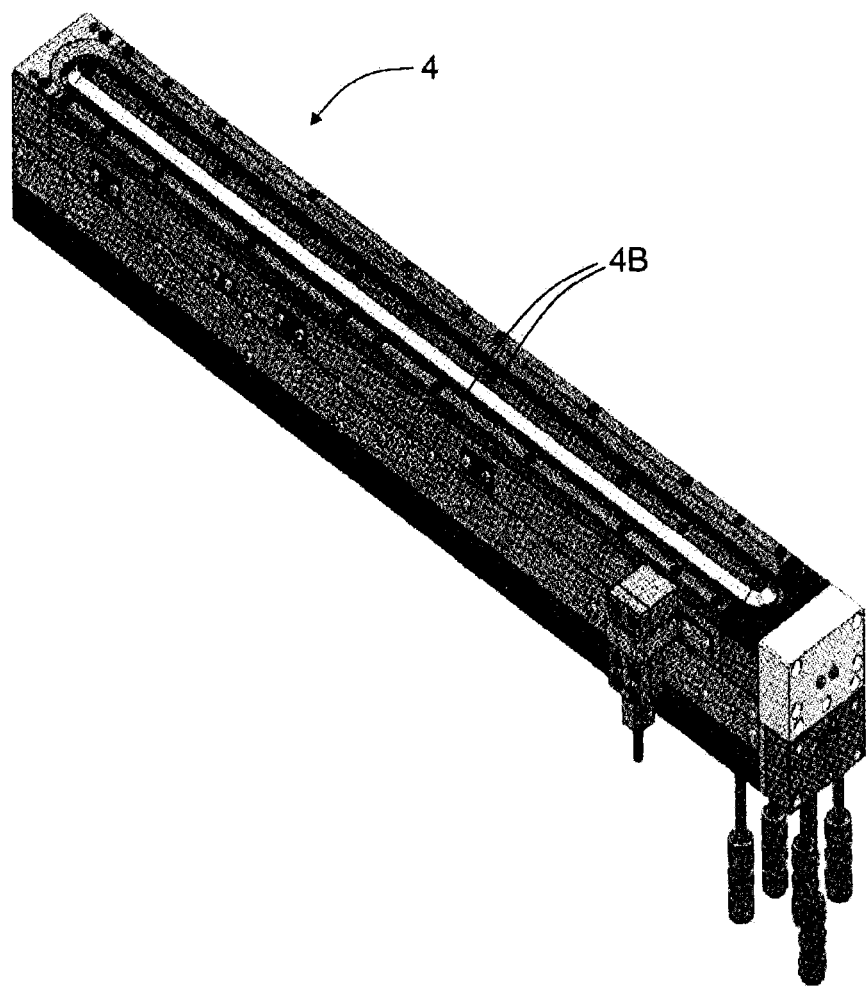

[FIG. 5]
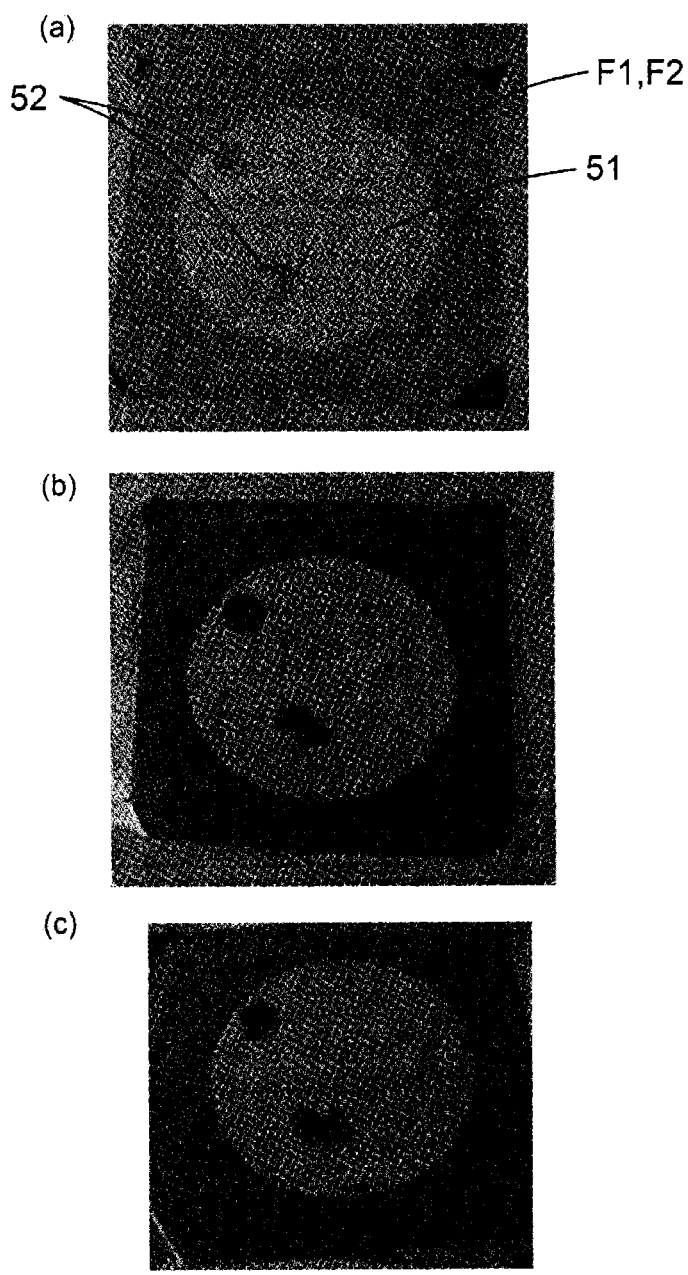

[FIG. 6]
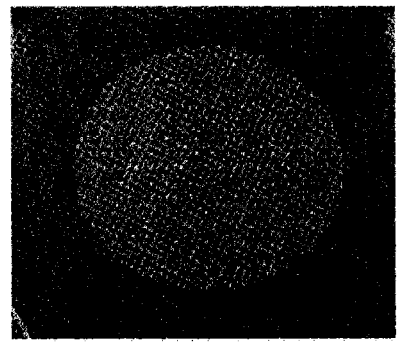
[FIG. 7]
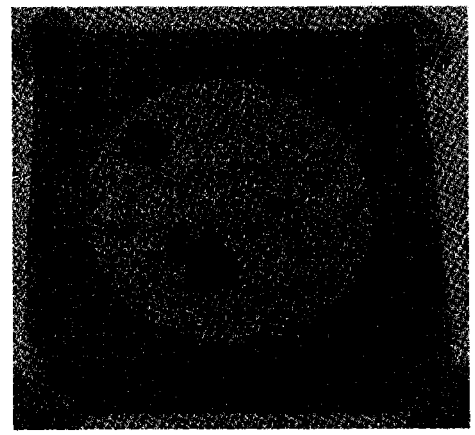
[FIG. 8]
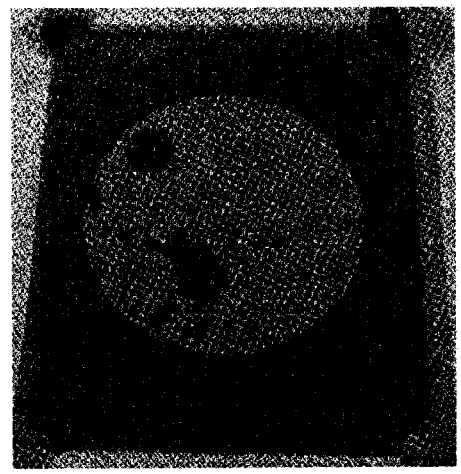

[FIG. 9]
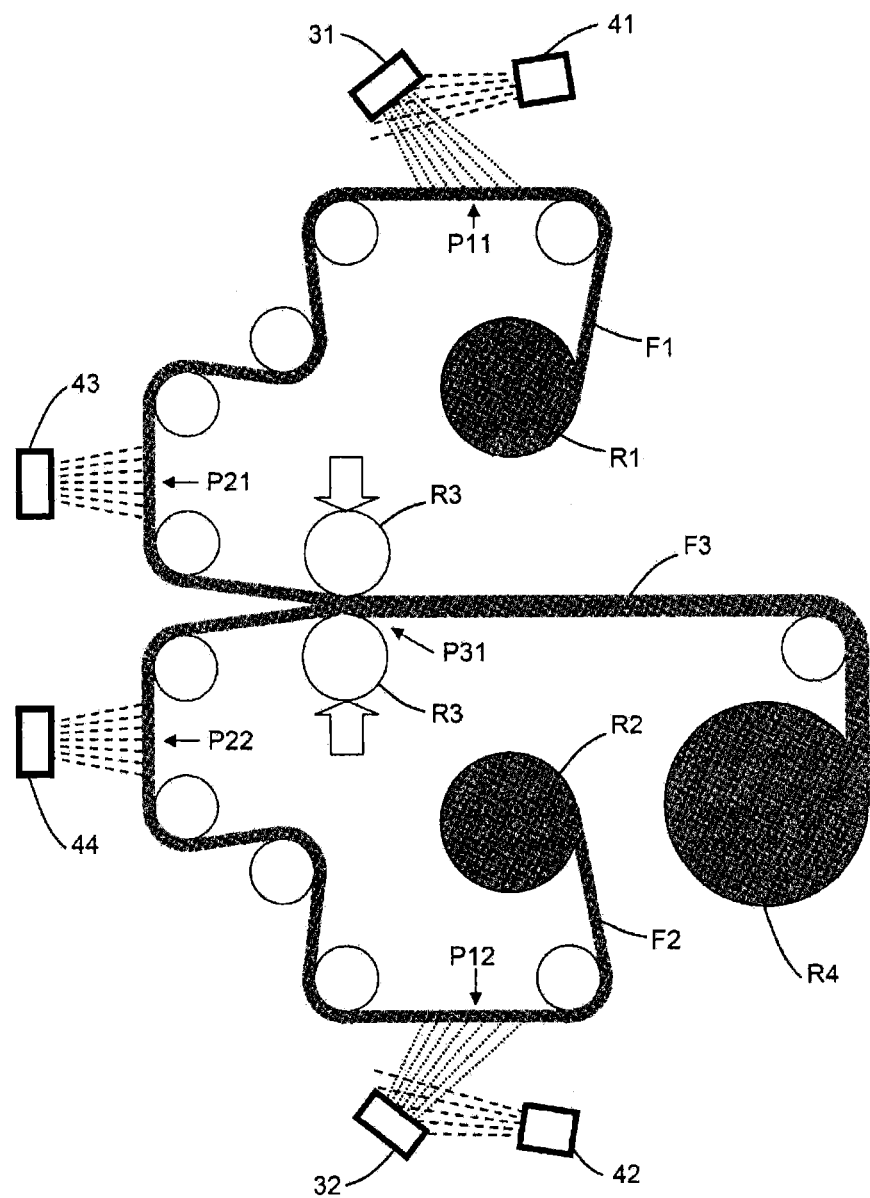

US 9,962,908 B2

METHOD FOR BONDING POLYMER FILM AND POLYMER FILM, METHOD FOR BONDING POLYMER FILM AND INORGANIC MATERIAL SUBSTRATE, POLYMER FILM LAMINATE, AND LAMINATE OF POLYMER FILM AND INORGANIC MATERIAL SUBSTRATE

TECHNICAL FIELD

The present invention relates to art for bonding polymer films without the use of organic adhesives.

BACKGROUND ART

In the field of electronic devices, advances have been made in the development of thin, large-area electronic devices. For example, in flat panel displays using organic EL devices, it is common to use a structure wherein the organic EL devices are disposed between two substrates of an inorganic material such as glass. By bonding these two substrates closely together at their peripheral portions by using so-called frit materials, the organic EL devices can be sealed from the external environment and thereby protected from oxygen and moisture which may have detrimental effects.

In recent years, there have been demands to make thin, large-area electronic devices more flexible. In order to respond to these demands, the use of polymer films such as polyethylene naphthalate (PEN) and polyethylene terephthalate (PET) as substrates for devices has been suggested.

However, the above-mentioned frit materials require laser irradiation for bonding, and are therefore not suited for use in sealing materials for polymer films with a low melting point. Furthermore, frit materials are deficient in elasticity and are not suitable for electronic devices such as flexible displays.

On the other hand, techniques using organic adhesives have been developed in order to bond and laminate polymer films at a low temperature (Patent Document 1). However, it is difficult to finely pattern an applied organic adhesive for mounting electronic devices, so bonding methods using organic adhesives are not suitable for mounting of electronic devices for which the structures of the bonding interface are becoming smaller and smaller. Furthermore, in special environments such as in a vacuum, organic solvents will be released by evaporation or the like from the layers of adhesive in the final product over time, which can result in reduced mechanical strength of the bonded portions.

Additionally, organic materials are used as adhesives not only for bonding polymer films, but also, for example, in the touch panels of smartphones and the like in which a polymer film is bonded to a glass substrate. However, with organic adhesives, the probability of defects such as bubbles occurring rises as panels become larger, and this reduces yield, which is a factor in raising final costs.

RELATED ART DOCUMENTS

Patent Documents

Patent Document 1: JP 2008-150550 A

SUMMARY OF THE INVENTION

Problems to be Solved by the Invention

In order to solve the above-described problems, the present invention has the purpose of offering a method for firmly and inexpensively bonding at low temperature a polymer film to another polymer film or to an inorganic material substrate without the use of an organic adhesive.

Means for Solving the Problems

In order to solve the above-described technical problems, the method for bonding a plurality of polymer films according to the present invention comprises steps of forming a first inorganic material layer over part or all of a first polymer film; forming a second inorganic material layer over part or all of a second polymer film; surface-activating a surface of the first inorganic material layer by bombardment with particles having a predetermined kinetic energy; surface-activating a surface of the second inorganic material layer by bombardment with particles having a predetermined kinetic energy; and bringing a surface of the surface-activated first inorganic material layer and a surface of the surface-activated second inorganic material layer into contact to bond the first polymer film and the second polymer film. According to the present invention, polymer films can be firmly and inexpensively bonded at low temperature without the use of an organic adhesive for bonding portions of various shapes from finely patterned bonding portions to large-area bonding portions.

In the bonding method according to the present invention, the first inorganic material layer formed on the first polymer film and the second inorganic material layer formed on the second polymer film are each formed by sputtering. As a result, an inorganic material layer with a strong adhesive force with respect to polymer films can be formed.

In the bonding method according to the present invention, the first polymer film and the second polymer film are formed using a polyimide resin or a polyester resin chosen from the group consisting of polyethylene naphthalate (PEN), polyethylene terephthalate (PET), polybutylene terephthalate (PBT) and polytrimethylene terephthalate (PTT) as a main component. As a result, the present invention can be applied flexibly to a wide range of applications.

In the bonding method according to the present invention, the first polymer film and the second polymer film are formed of different materials. As a result, a laminated structure of various polymer films can be achieved.

In the bonding method according to the present invention, the first inorganic material layer and the second inorganic material layer are formed using a metal chosen from the group consisting of copper (Cu), aluminum (Al) and iron (Fe) or an alloy thereof as a main component. By using a metal in the inorganic material layer, a laminate of polymer materials of high adhesive strength and high flexibility can be provided.

In the bonding method according to the present invention, the first inorganic material layer and the second inorganic material layer are formed using silicon (Si) as a main component. As a result, the process for the surface treatment can be easily adjusted due to the use of a material that is frequently used in semiconductor processes.

In the bonding method according to the present invention, the first inorganic material layer and the second inorganic material layer are formed with silicon (Si) as a main component, and comprising iron. As a result, a polymer film laminate that is firmly bonded and capable of being easily used in common semiconductor component fabrication processes can be provided.

In the bonding method according to the present invention, the first inorganic material layer and the second inorganic material layer consist of layers of a plurality of materials. As a result, an inorganic material layer with high bonding strength to the polymer film while also having high bonding strength to the inorganic material layer can be formed.

In the bonding method according to the present invention, the surface-activating step is performed by bombarding the surfaces of the first inorganic material layer and the second inorganic material layer with argon (Ar) particles having a kinetic energy of 0.1 keV to 2 keV. As a result, a laminate of polymer films of high bonding strength can be offered.

The bonding method according to the present invention further comprises steps of heating the first polymer film to a temperature no greater than a melting point or no greater than a pyrolysis temperature of the first polymer film, before forming the first inorganic material layer; and heating the second polymer film to a temperature no greater than a melting point or no greater than a pyrolysis temperature of the second polymer film, before forming the second inorganic material layer. As a result, the amount of water contained in the polymer film can be reduced, the degree of vacuum of the bonding process can be raised, the time required for the entire process can be shortened, and activation of the surface during the surface activation process can be enhanced.

In the bonding method according to the present invention, a pressure of at least 5 MPa is applied in a direction perpendicular to a bonding interface between the first polymer film and the second polymer film when bringing the surface of the surface-activated first inorganic material layer and the surface of the surface-activated second inorganic material layer into contact. As a result, the substantial area of contact between the surface-activated inorganic material layers can be increased to raise the bonding strength.

The method of bonding a polymer film according to the present invention comprises steps of supplying a first polymer film in tape form from a first supply roller; supplying a second polymer film in tape form from a second supply roller; forming a first inorganic material layer on the first polymer film supplied from the first supply roller; forming a second inorganic material layer on the second polymer film supplied from the second supply roller; surface-activating a surface of the first inorganic material layer by bombardment with particles having a predetermined kinetic energy; surface-activating a surface of the second inorganic material layer by bombardment with particles having a predetermined kinetic energy; bringing the surface of the surface-activated first inorganic material layer and the surface of the surface-activated second inorganic material layer into contact to bond the first polymer film and the second polymer film; and winding a laminated polymer film formed by bonding the first polymer film and the second polymer film onto a winding roller. As a result, a polymer film laminate can be efficiently produced without using an organic adhesive.

The method of bonding a polymer film to an inorganic material substrate according to the present invention comprises steps of forming a first inorganic material layer on part or all of a polymer film; forming a second inorganic material layer on part or all of an inorganic material substrate; surface-activating a surface of the first inorganic material layer by bombardment with particles having a predetermined kinetic energy; surface-activating a surface of the second inorganic material layer by bombardment with particle having a predetermined kinetic energy; and bringing the surface of the surface-activated first inorganic material layer and the surface of the surface-activated second inorganic material layer into contact to bond the polymer film and the inorganic material substrate. According to the present invention, a polymer film can be firmly bonded to an inorganic material substrate at a low temperature without using an organic adhesive.

The polymer film laminate according to the present invention comprises a first polymer film; a second polymer film; and an inorganic material layer disposed between part or all of the first polymer film and the second polymer film, and bonding the first polymer film and the second polymer film. As a result, a polymer film laminate having high tensile strength without using an organic adhesive material can be provided for a wide range of applications.

In the polymer film laminate according to the present invention, the first polymer film and the second polymer film are formed using a polyimide resin or a polyester resin as a main component. As a result, the present invention can be applied to a range of applications using a wide range of flexible materials such as polyimide resin polymer films or polyester resin polymer films.

In the polymer film laminate according to the present invention, the first inorganic material layer and the second inorganic material layer are formed using a metal chosen from the group consisting of copper (Cu), aluminum (Al) and iron (Fe) or an alloy thereof as a main component. In this way, a laminate of polymer materials of high adhesive strength and high flexibility can be offered by using a metal in the inorganic material layer.

In the polymer film laminate according to the present invention, the first inorganic material layer and the second inorganic material layer are formed using silicon (Si) as a main component. As a result, the surface treatment process can be easily adjusted by using a material that is frequently used in semiconductor processing.

In the polymer film laminate according to the present invention, the first inorganic material layer and the second inorganic material layer are formed with silicon (Si) as a main component and comprising iron. As a result, a polymer film laminate that is firmly bonded and capable of being easily used in common semiconductor component fabrication processes can be obtained.

In the polymer film laminate according to the present invention, the first inorganic material layer and the second inorganic material layer consist of layers of a plurality of materials. As a result, it is possible to form an inorganic material layer with high bonding strength to the polymer film while also having high bonding strength to the inorganic material layer.

The polymer film laminate according to the present invention comprises a polymer film; an inorganic material substrate; and a bonding layer of inorganic material disposed between part or all of the polymer film and the inorganic material substrate, and bonding the polymer film and the inorganic material substrate. As a result, a laminate of a polymer film and an inorganic material substrate having high tensile strength without containing an organic adhesive can be offered for a wide range of applications.

Effects of the Invention

According to the present invention, a polymer film can be firmly bonded at a low temperature without the use of an organic adhesive. Additionally, since an organic adhesive is not used, it can be used in applications requiring bonding interfaces of various forms, from regions that are finely patterned to large areas. Additionally, since high-temperature heating steps are not used, it is possible to inexpensively obtain a laminate whose original polymer film properties will not be lost. Furthermore, since an organic adhesive is not used, a polymer film in which the bonding strength will not decrease even when placed in a special environment such as a vacuum can be obtained.

BRIEF DESCRIPTION OF THE DRAWINGS

FIG. 1 A flow chart showing a bonding method according to a first embodiment.

FIG. 2 A schematic diagram showing an arrangement for carrying out a bonding method according to the first embodiment.

FIG. 3 A schematic section view showing the steps in a bonding method according to the first embodiment.

FIG. 4 A perspective view showing a fast atom beam source.

FIG. 5 A perspective view showing a bonding region.
FIG. 6 A perspective view showing a bonding region.
FIG. 7 A perspective view showing a bonding region.
FIG. 8 A perspective view showing a bonding region.
FIG. 9 A schematic view showing an example of an arrangement for carrying out a bonding method according to a second embodiment.

MODES FOR CARRYING OUT THE INVENTION

Herebelow, embodiments of the present invention will be explained with reference to the attached drawings.

1. First Embodiment

FIG. 1 is a flow chart showing a method of bonding two polymer films according to a first embodiment of the present invention.

In step S1, a first inorganic material layer is formed on a first polymer film. Next, in step S2, the surface of the first inorganic material layer formed on the first polymer film is surface-activated. Similarly, a second inorganic material layer is formed on the second polymer film (step S3), after which the surface of the second inorganic material layer is surface-activated (step S4). Following step S2 and step S4, the surface of the first inorganic material layer and the surface of the second inorganic material layer which have been surface-activated are brought into contact with each other. Since the surfaces of the surface-activated inorganic material layers are in an activated state, a bonding interface with sufficient bond strength can be formed simply by bringing them into contact with each other, without requiring a high-temperature heating step. Herebelow, the respective steps will be explained with reference to FIG. 2 which schematically shows an apparatus for carrying out the present invention, and FIG. 3 which shows schematic section views of the products of the respective steps.

1.1 Formation of Inorganic Material Layer on Polymer Film

The formation of an inorganic material layer on a polymer film in step S1 and step S3 can be achieved by various techniques, but deposition of a predetermined inorganic material onto the polymer film by sputtering is preferred.

In that case, as shown in FIG. 2(a), polymer films F1 and F2 having an inorganic material layer formed on the surfaces thereof and a sputter target 3 consisting of an inorganic material are disposed inside a vacuum chamber 2 of a bonding apparatus 1. Preferably, the apparatus is arranged so as to direct a particle beam 5 from a particle beam source 4 to the sputter target 3, so that atoms or clusters 7 from the inorganic material are ejected toward the polymer films F1 and F2.

In FIG. 2, the first polymer film F1 and the second polymer film F2 are supported by a moveable support 6. As a result, the polymer film can be moved relative to the sputter target or particle beam source during formation of the inorganic material layer and surface activation, so as to form an inorganic material layer of uniform thickness or perform surface activation of the inorganic material layer under uniform conditions. Additionally, after formation of the first inorganic material layer on the first polymer film F1 is completed, the support 6 is moved so as to place the second polymer film F2 at a predetermined position where a second inorganic material layer I2 can be formed on the second polymer film F2 using the same sputter target 3 and particle beam source 4 (FIG. 2(b), FIG. 3(a) and FIG. 3(c)).

By using aluminum (Al), copper (Cu), iron (Fe) or an alloy thereof as the material forming the sputter target, an inorganic material layer mainly composed of a metal such as aluminum (Al), copper (Cu), iron (Fe) or an alloy thereof can be formed. The material forming the inorganic material layer is not limited to the above metals. For example, it is possible to use a transition metal such as titanium (Ti), tantalum (Ta), chromium (Cr), gold (Au) or platinum (Pt), or a solder alloy comprising tin (Sn) or silver (Ag).

Additionally, by using silicon (Si) or another non-metallic material as the material forming the sputter target, it is possible to form an inorganic material layer mainly composed of silicon (Si) or another non-metallic material. A material other than silicon (Si) may be used as the non-metallic material. For example, oxides such as or including silicon oxide ($SiO_2$) and aluminum oxide ($Al_2O_3$), nitrides such as or including silicon nitride (SiN), aluminum nitride (AlN) and titanium nitride (TiN), carbides such as or including silicon carbide (SiC) and titanium carbide (TiC), or composites of inorganic materials including the above-mentioned oxides, nitrides or carbides may be used.

Furthermore, laminates of a plurality of the above-mentioned inorganic material layers of the same type, or laminates of a plurality of layers of different type may be formed as the inorganic material layer of the present invention.

When forming an inorganic material layer with a non-metallic material as the main component, a predetermined amount of metal should preferably be mixed into the inorganic material layer. For example, when forming an inorganic material layer mainly composed of silicon (Si), a transition metal such as iron should preferably be mixed in so as to be present at a proportion of less than one atomic layer on the surface of the inorganic material layer. As a result, the bonding strength can be improved.

The inorganic material layer can be formed over the entire polymer film, or formed on just a portion of the polymer film. For example, when sealing a certain device between two polymer films, the inorganic material layer should preferably be formed only at the peripheral portions of the polymer films that are to be bonded together. Additionally, an inorganic material layer having a fine pattern may be formed on the polymer film by applying microfabrication techniques from the field of semiconductors.

<Surface Activation of Inorganic Material Layer>

While the surface activation of the inorganic material layer in step S2 and step S4 can be performed by various techniques, particles (particle beam 5) having a predetermined kinetic energy should be emitted from a particle beam source 4 to bombard the particles on the surface of the inorganic material layer.

During surface activation, as shown in FIG. 2(b), after the inorganic material layers I1 and I2 are formed on the polymer films F1 and F2 (FIG. 3(a) and FIG. 3(c)), the particle beam source 4 is rotated about an axis of rotation 4A to change the orientation of the particle beam source 4 toward the polymer films F1 and F2. Then, particles (particle beam 5) of a predetermined kinetic energy are emitted from the particle beam source 4 toward the surfaces of the inorganic material layers I1 and I2. As a result of this surface activation, the surface A1 (FIG. 3(b)) and surface A2 (FIG. 3(d)) of the inorganic material layers I1 and I2 are in a state of high surface energy.

In the arrangement shown in FIGS. 2(a) and (b), the first polymer film F1 and the second polymer film F2 are supported on a moveable support 6. As a result, after surface activation of the first inorganic material layer I1 formed on the first polymer film F1 is completed, the support 6 is moved so as to place the second polymer film F2 at a predetermined position, and the same particle beam source 4 can be used to surface-activate the second inorganic material layer I2 formed on the second polymer film F2.

In the above description, step S2 and step S4 were performed after performing step S1 and step S3, but the sequence need not be limited to being from step S1 to step S4. The sequence of step S1 to step S4 may be appropriately changed as long as step S2 is performed after step S1, step S4 is performed after step S3, and step S5 is performed after step S2 and step S4. For example, step S1 and step S2 may be followed by step S3 and step S4, which are then followed by step S5.

<Particle Beam Source>

As described above, the arrangement may be simplified by using the same particle beam source as the particle beam source for sputtering and the particle beam source for surface activation. Additionally, the required time between steps can be reduced because it is possible to switch between formation and surface activation of the inorganic material layer simply by rotating the particle beam source (FIG. 2(a) and FIG. 2(b)).

As the particle beam source 4, a linear particle beam source as shown in FIG. 4 may be used. The linear particle beam source has a linear (line-shaped) particle beam emission port 4B, and is capable of emitting a linear (line-shaped) particle beam from this emission port 4B. The length of the emission port 4B should preferably be greater than the maximum size in the direction of extension of the emission port on the polymer film that may be moved with respect to the particle beam source.

The particle beam emitted from the linear particle beam source irradiates a linear region on the surface of the inorganic material layer at a certain time during the surface activation. While emitting a particle beam from the linear particle beam source toward the polymer film on which an inorganic material layer is formed, the particle beam source is scanned in a direction perpendicular to the direction of extension of the emission port. As a result, the irradiation region of the linear particle beam passes through all regions of the inorganic material layer associated with bonding. When the linear particle beam source has finished passing over the polymer film, the inorganic material layer on the polymer film is surface-activated by irradiation with the particle beam.

The technique of scanning the linear particle beam source is suited to irradiation of the surface of a film of relatively large area with a relatively uniform particle beam. Additionally, a linear particle beam source can irradiate various surface shapes that are to be surface-activated with a relatively uniform particle beam.

When a material of low conductivity such as a polymer film is irradiated with particles carrying an electric charge such as ions, the electric charge accumulates on the low-conductivity polymer film. Since the electric charge accumulating in the polymer film will decelerate the ions directed toward the polymer film, the desired surface activation will eventually not be able to be performed on the polymer film. Therefore, the accelerated ions should preferably be passed through an electron cloud to partially or completely neutralize the ions. The neutralized ions will form neutral atoms for bombarding the polymer film without losing most of their kinetic energy. The particle beam source should preferably be a fast atom beam source (not shown) having such a neutralizing mechanism (neutralizer) formed therein. In the examples to be explained below, the fast atom beam sources have a neutralizer, and this neutralizer is used for neutralizing particle beams.

Additionally, the sputter target should preferably be linear, extending in the same direction as the emission port of the linear particle source, having a length corresponding to that of the emission port, and being movable with respect to the polymer film (not shown). The linear sputter target can emit atoms or clusters of inorganic material linearly (in the shape of a line).

Accordingly, by scanning the linear particle beam source and the linear sputter target relative to the polymer film while retaining their relative spatial positioning, in other words, in a single piece, an inorganic material of desired thickness can be deposited on the surface of a film of relatively large area. The deposition thickness and deposition rate of the inorganic material can be controlled by the radiation properties of the particle beam from the linear particle beam source and the relative scanning speed and number of scans of the linear particle beam source and the linear sputter target with respect to the polymer film.

<Bonding of Surface-Activated Inorganic Material Layer>

When performing surface activation of the inorganic material layer using a particle beam source, the steps from the inorganic material layer surface activation steps S2 and S4 to the steps of bringing the surfaces A1 and A2 of the surface-activated inorganic material layers I1 and I2 into contact with each other should preferably be performed without breaking a vacuum. Specifically, the degree of vacuum before processing should preferably have reached a pressure of $1 \times 10^{-5}$ Pa (Pascals) or less. This degree of vacuum is necessary to drive the particle beam source and to reduce adhesion of oxygen, water or contaminant particles present in the residual atmosphere so that a bonding interface with sufficient bonding strength can be formed simply by bringing the surface-activated inorganic material layers into contact.

For example, as shown in FIG. 2(c), the support 6 may be arranged so as to be able to be folded at an axis of rotation 6A provided between portions supporting the polymer films F1 and F2. As a result, as shown in FIG. 2(d), the surfaces A1 and A2 of the surface-activated inorganic material layers I1 and I2 on the polymer films F1 and F2 can be brought into contact over roughly their entirety using a simple arrangement, enabling a bonding interface between the inorganic material layers I1 and I2 to be easily formed (FIG. 3(e)).

The polymer film of the present invention comprises a polyester resin or a polyimide resin. Polyester resins include polyethylene naphthalate (PEN), polyethylene terephthalate (PET), polybutylene terephthalate (PBT) and polytrimethylene terephthalate (PTT). Polyimide resins include Kapton (registered trademark). However, the polymer film is not limited to polyester resins and polyimide resins, and other polymer materials may be appropriately chosen. Additionally, the polyester resins and polyimide resins need not be limited to the materials indicated above.

The thickness of the polymer film in the examples described below is 125 μm (microns), but is not limited thereto. The thickness of the polymer film may be appropriately chosen depending on the application of the polymer film.

Regarding the surface dimensions of the polymer film, the below-described examples use 7 cm square, of which bonding was performed in a circular region with a diameter of about 5 cm, but there need not be such a limitation. The present invention is capable of bonding polymer films and substrates of larger area, and in principle, there is no limit to the size of the polymer films or substrates to be bonded.

Additionally, step S1 or step S3 of forming the inorganic material layer may be preceded by a step of surface activation by bombarding the surface of the polymer film with particles having a predetermined kinetic energy. Bombardment of the polymer film by particles having high kinetic energy may cause changes in the vicinity of the surface and loss of desired properties of the polymer film, or increase the surface roughness so that sufficient bonding strength is not obtained. Therefore, the kinetic energy of the particles should preferably be set to be lower than the kinetic energy of the particles used for surface activation in step S2 or step S4.

Example 1

As a first example of the first embodiment, the bonding procedure when using PET as the polymer film and aluminum (Al), copper (Cu) or silicon (Si) as the inorganic material layer will be explained.

In this example, a pair of PET films of about 7 cm square with a thickness of 125 μm (microns) was used.

If the polymer film contains water, it will evaporate in the vacuum atmosphere and reduce the vacuum level, thus prolonging the time required for evacuation prior to processing. Therefore, in order to reduce the amount of water contained in the PET film, the PET film was heated for 1 hour at 80 degrees Celsius (80° C.) before being loaded into the vacuum chamber. The temperature of heating in this case should preferably be no more than the melting point or pyrolysis temperature of the material forming the polymer film.

First, the case in which aluminum (Al) or silicon (Si) is used as the inorganic material layer shall be explained. The formation of the inorganic material layer with aluminum (Al) and the formation of the inorganic material layer with silicon (Si) were performed under the same operating conditions of the linear fast atom beam source. Argon (Ar) particles that were generated in a plasma and accelerated with a potential difference of 1.2 kV were emitted from the linear fast atom beam source toward a sputter target of aluminum (Al) or silicon (Si). The linear fast atom beam source was operated under conditions of 1.2 kV and 400 mA while supplying 93 sccm of argon (Ar). Most of the accelerated argon ions were neutralized by the neutralizer while maintaining almost all of their kinetic energy. Due to sputtering by bombardment with the argon atom beam emitted from the particle beam source, atoms or clusters of aluminum (Al) or silicon (Si) were ejected from the sputter target toward the PET film. The linear fast atom beam source and linear sputter target, as a single body, were scanned a total of three times at a relative speed of 1200 mm/min across the polymer film. Under the above conditions, an aluminum (Al) or silicon (Si) layer of about 10 nm was formed on the polymer film.

Next, without breaking the vacuum atmosphere, the surface of the formed aluminum (Al) or silicon (Si) layer was surface-activated. For surface activation, the same linear fast atom beam source as was used for the formation of the inorganic material layer was used. The linear fast atom beam source was driven under conditions of 1.0 kV and 100 mA while supplying 70 sccm of argon (Ar), to emit an argon particle beam toward the polymer film, and scanned once across the polymer film at a relative speed of 1200 mm/min.

Next, the case wherein copper is used for the inorganic material layer will be explained. Argon (Ar) particles generated by a plasma and accelerated by a potential difference of 1.2 kV were emitted from a linear fast atom beam source toward the copper (Cu) sputter target. The linear fast atom beam source was operated under conditions of 1.2 kV and 400 mA while supplying 93 sccm of argon (Ar). Most of the accelerated argon ions were neutralized by the neutralizer while retaining almost all of their kinetic energy. Due to sputtering by bombardment with the argon atom beam emitted from the particle beam source, atoms or clusters of copper (Cu) were ejected from the sputtering target toward the PET film. The linear fast atom beam source and linear sputter target, as a single body, were scanned a total of six times at a relative speed of 1200 mm/min across the polymer film. Under the above conditions, a copper layer of about 10 nm was formed on the polymer film.

Next, without breaking the vacuum atmosphere, the surface of the formed copper layer was surface-activated. For surface activation, the same linear fast atom beam source as was used for the formation of the inorganic material layer was used. The linear fast atom beam source was driven under conditions of 1.0 kV and 100 mA while supplying 70 sccm of argon (Ar), to emit an argon particle beam toward the polymer film, and scanned twice across the polymer film at a relative speed of 1200 mm/min.

Two inorganic material layers formed from the same material, i.e. aluminum, copper or silicon surface-activated under the above-described conditions, were brought into contact with each other to bond the polymer films. At this time, a force of about 10 kN, i.e. a pressure of about 5 MPa was applied for 3 minutes using a circular jig having an approximately flat surface with a diameter of about 50 mm at a roughly central portion of the film.

The degree of vacuum in the vacuum chamber before initiating the process was $1\times10^{-5}$ Pascals (Pa) or less. The above-described process from the formation of the inorganic material layer, through surface activation and to the bonding step were performed without breaking the vacuum.

FIG. 5 shows photographic images of polymer films after bonding. They enable confirmation that a good bonding region 51 was formed over roughly the entire portion that was compressed by the jig. The two different colored regions 52 inside the bonding region are believed to be regions that are not bonded. Since these regions occur at the same locations with respect to the jig in numerous experimental results (see FIGS. 5, 7 and 8), they appear to be regions where the jig is not completely flat, so the polymer film was not adequately pressed and the inorganic material layers did not come into contact.

In experiments wherein a force of 1 kN to 7 kN was applied at the time of bonding and the other conditions were kept the same, the area of the regions that were not bonded became larger than when a force of 10 kN was applied. Therefore, when bonding with the same bonding equipment as used in the present example, a force of at least 10 kN, i.e. a pressure of at least 5 MPa, should preferably be applied at the time of bonding in order to increase the bonding area. Additionally, in experiments with the same conditions other than the fact that a force of 10 kN was applied, the area of the unbonded regions was greater with a compression time of 1 minute. Therefore, when bonding with the same bonding equipment as the present example, a force of at least 10 kN should preferably be applied over a period of at least 3 minutes for bonding.

On the other hand, the unbonded regions 52 disappeared upon pressing lightly with the fingers after removing the polymer films from the vacuum system after bonding (FIG. 6). Therefore, the polymer film was found to be capable of being bonded even with a light force as long as the inorganic material layers were brought into contact with each other.

The above-described experimental results appear to show that it is useful to apply pressure to all portions of the film to be bonded by a mechanism for contacting the films in order to increase the substantial bonding area between the inorganic material layers.

The arrangement shown in FIG. 2 is no more than an example, and other structures could also be employed.

Example 2

While PET was used as the polymer film in Example 1, the same bonding experiments were performed using PEN as the polymer film. As in the case of PET, a bonding interface was observed to be formed over roughly the entire region pressed by the jig, for all of the inorganic material layers. FIG. 7 is a photographic image showing a bonding region of a polymer film after bonding when using copper for the inorganic material layer.

Example 3

In Example 3, PEN was used as the polymer film and a layer of silicon and a layer of aluminum were laminated to form the inorganic material layer. In the present example, the conditions for formation of the inorganic material layer and the conditions for surface activation were different from those of Example 1, but all other conditions were the same. Herebelow, the conditions for formation of the inorganic material layer and the conditions for surface activation will be explained.

First, in order to form a layer of silicon on the polymer film, argon (Ar) particles that were plasmatized and accelerated with a potential difference of 1.2 kV by a linear fast atom beam source were emitted toward a sputter target of silicon (Si). The linear fast atom beam source was operated under conditions of 1.2 kV and 400 mA while supplying 93 sccm of argon (Ar). Most of the accelerated argon ions were neutralized by the neutralizer while retaining almost all of their kinetic energy. Due to sputtering by bombardment with the argon atom beam emitted from the particle beam source, atoms or clusters of silicon (Si) were ejected from the sputtering target toward the PET film. The linear fast atom beam source and linear sputter target, as a single body, were scanned once at a relative speed of 1200 mm/min across the polymer film.

Next, the sputter target was changed from silicon (Si) to aluminum (Al), and an aluminum (Al) layer was deposited on the layer of silicon (Si) under the same conditions. As a result, an inorganic material layer of about 5 nm was formed.

Subsequently, without breaking the vacuum, the surface of the formed aluminum (Al) layer was surface-activated. Surface activation was performed using the same linear fast atom beam source as that used for formation of the inorganic material layer. The linear fast atom beam source was operated under conditions of 1.0 kV and 100 mA while supplying 70 sccm of argon (Ar) to emit an argon particle beam toward the polymer film which was scanned once at a relative speed of 1200 mm/min across the polymer film.

FIG. 8 is a photographic image of a polymer film after bonding. It shows that a bonding interface was formed over roughly the entire region that was compressed by the jig.

Additionally, upon changing the sequence of the layers of material in the inorganic material layer so as to first form a layer of aluminum (Al) on the polymer film and form a layer of silicon (Si) thereon, and performing experiments keeping the other conditions the same, similar results were obtained (not shown).

<Tension Test>

Upon subjecting a bonded article obtained by bonding these polymer films to a stripping test from the edge of the bonding region, the polymer films were destroyed without breaking at the bonding interface. Furthermore, the bonded article of the polymer films was subjected to a tension test wherein a pair of jigs was firmly adhered to the polymer films and the jigs were pulled in a direction perpendicular to the bonding surface. Hereafter, the value of the force being applied when the bonded article was destroyed divided by the bonding area will be referred to as the tensile strength. In the case of all the samples, the bonding interface was not destroyed during the tension test, and destruction occurred within the polymer films. Accordingly, it was discovered that the tensile strength of the bonding interface is higher than the tensile strength of the polymer film. In all of the cases, destruction was not observed until reaching a value exceeding about 50 kgf/cm$^2$. Based on the above, it was confirmed that the bonding method for a polymer film according to the present invention is capable of forming a bonded article of polymer films having good mechanical strength without requiring a heating step.

In Examples 1 to 3, the acceleration voltage of the linear fast atom beam source when sputtering was set to 1.2 kV. When this acceleration voltage was set to 1.5 kV, the unbonded region increased compared to when the acceleration voltage was set to 1.2 kV. Therefore, in the case of these examples, the acceleration voltage of the linear fast atom beam source when sputtering should preferably be less than 1.5 kV. In other words, the kinetic energy of particles emitted from the linear fast atom beam source should preferably be less than 1.5 keV.

In Examples 1 to 3, the acceleration voltage of the linear fast atom beam source when sputtering was set to 1.0 kV. However, the acceleration voltage is not limited to this value. The value may be adjusted between 0.1 kV and 2 kV depending on the properties of the inorganic material layer, the state of the surface of the inorganic material layer before surface activation, and various conditions other than the voltage of the linear atom beam source. In other words, it is adjusted so that the kinetic energy of the particles emitted from the linear fast atom beam source is 1.0 keV to 2.0 keV.

Additionally, while the inorganic material layer was formed to a thickness of about 10 nm in Examples 1 to 3, the thickness of the inorganic material layer need not be limited thereto. However, in these examples, when the thickness of the inorganic material layer was less than 3 nm, the unbonded region increased, so the thickness of the inorganic material layer should preferably be at least 3 nm.

2. Second Embodiment

FIG. 9 is a schematic front view showing an example of a so-called roll-to-roll arrangement for more efficiently bonding together the polymer films of the first embodiment.

From a first supply roller R1 and a second supply roller R2, a first polymer film F1 and a second polymer film F2 wound onto the respective supply rollers are supplied. At positions P11 and P12, sputtering by particles emitted from the particle beam sources 41 and 42 causes a predetermined type of inorganic material from the sputtering targets 31 and 32 to be ejected toward the polymer films F1 and F2. Next, the polymer films F1 and F2 which have advanced within the apparatus are irradiated with particles from the particle beam sources 43 and 44 at positions P21 and P22 in order to surface-activate the surfaces of the inorganic material layers. Then, at position P31, the two polymer films are brought into contact between a pair of bonding rollers R3, and the necessary pressure is applied by the bonding rollers R3 to bond the polymer films. A laminated polymer film F3 produced by bonding is wound onto the winding roller R4.

The respective components such as the supply rollers, particle beam sources, sputter targets, bonding rollers and winding roller are not limited to those of the example shown in FIG. 9, and various modifications are possible, such as in their positions or number. Additionally, the respective components should preferably be provided inside a vacuum chamber capable of reaching a pressure of $10^{-5}$ Pa.

3. Third Embodiment

In the first and second embodiments, a polymer film and a polymer film were bonded together, but in the third embodiment, the polymer film is bonded to a glass substrate as one example of an inorganic material. In the present embodiment, an inorganic material layer is formed on the polymer film and the glass substrate, the surface of the formed inorganic material layer is surface-activated, and the surface-activated inorganic material layers are brought into contact with each other to bond the polymer film and the glass substrate.

The surface of the glass substrate may be surface-activated before forming the inorganic material layer. The operating conditions for the particle beam source during surface activation may be set so as to raise the strength of the bonding interface achieved between the inorganic material layer and the glass substrate.

While not shown, the present inventors have confirmed that the polymer film and the glass substrate are firmly bonded by the present invention.

In the third embodiment, a glass substrate was used as an example of the inorganic material substrate, but it need not be limited thereto. The material for forming the inorganic material substrate may, aside from glass, be an oxide such as sapphire, a carbide such as silicon carbide, a nitride, a compound semiconductor, a semiconductor of silicon, germanium or the like, a ceramic, or an inorganic material generally used in optical devices.

While a number of embodiments of the present invention have been described above, these embodiments are merely examples for explaining the present invention. For example, in the above examples, two polymer films were bonded in a single bonding step, but according to the present invention, three or more polymer films can be laminated by repeating the bonding step. Similarly, two or more polymer films can be laminated onto a single glass substrate, or a plurality of glass substrates may be laminated with one or more polymer films. Additionally, the testing conditions should also be adjusted depending on the conditions such as the properties and positioning of the apparatus used. In the above examples, argon (Ar) was used as the particles for sputtering and surface activation, but there is no limitation thereto. For example, noble gases such as xenon (Xe), nitrogen, oxygen, or mixed gases thereof may be used. The claims cover many modifications to the embodiments within such a range as not to depart from the technical ideas of the present invention. Therefore, the embodiments and examples disclosed in the present specification are provided only for exemplary purposes, and they should not be construed as limiting the scope of the present invention.

DESCRIPTION OF THE REFERENCE NUMBERS 1 bonding apparatus
2 vacuum chamber
3, 31, 32 sputter target
4, 41, 42, 43, 44 particle beam source
4A axis of rotation of particle beam source
4B particle beam emission port
5 particle beam
6 support
6A axis of rotation of support
7 atoms or clusters of inorganic material
51 bonding region
52 unbonded region
F1, F2 polymer film
I1, I2 inorganic material layer
A1, A2 surface of inorganic material layer
R1, R2 supply roller
R3 bonding roller
R4 winding roller

The invention claimed is:

1. A method of bonding a polymer film, comprising steps of:
   forming a first inorganic material layer over part or all of a first polymer film;
   forming a second inorganic material layer over part or all of a second polymer film;
   surface-activating a surface of the first inorganic material layer by bombardment with particles having a predetermined kinetic energy;
   surface-activating a surface of the second inorganic material layer by bombardment with particles having a predetermined kinetic energy; and
   bringing a surface of the surface-activated first inorganic material layer and a surface of the surface-activated second inorganic material layer into contact to bond the first polymer film and the second polymer film,
   wherein the first inorganic material layer and the second inorganic material layer are formed using silicon (Si) as a main component, and comprise iron.

2. The method of bonding a polymer film according to claim 1, wherein the first inorganic material layer formed on the first polymer film and the second inorganic material layer formed on the second polymer film are each formed by sputtering.

3. The method of bonding a polymer film according to claim 1, wherein the first polymer film and the second polymer film are formed using a polyimide resin or a polyester resin chosen from the group consisting of polyethylene naphthalate (PEN), polyethylene terephthalate (PET), polybutylene terephthalate (PBT) and polytrimethylene terephthalate (PTT) as a main component.

4. The method of bonding a polymer film according to claim 1, wherein the first polymer film and the second polymer film are formed of different materials.

5. The method of bonding a polymer film according to claim 1, wherein the first inorganic material layer and the second inorganic material layer consist of layers of a plurality of materials.

6. The method of bonding a polymer film according to claim 1, wherein the surface-activating step is performed by bombarding the surfaces of the first inorganic material layer and the second inorganic material layer with argon (Ar) particles having a kinetic energy of 0.1 keV to 2 keV.

7. The method of bonding a polymer film according to claim 1, further comprising steps of:
heating the first polymer film to a temperature no greater than a melting point or no greater than a pyrolysis temperature of the first polymer film, before forming said first inorganic material layer; and
heating the second polymer film to a temperature no greater than a melting point or no greater than a pyrolysis temperature of the second polymer film, before forming said second inorganic material layer.

8. The method of bonding a polymer film according to claim 1, wherein a pressure of at least 5 MPa is applied in a direction perpendicular to a bonding interface between the first polymer film and the second polymer film when bringing the surface of the surface-activated first inorganic material layer and the surface of the surface-activated second inorganic material layer into contact.

9. The method of bonding a polymer film according to claim 1, wherein the step of bonding the first polymer film and the second polymer film is processed in a vacuum of $1 \times 10^{-5}$ Pa or less.

10. A method of bonding a polymer film, comprising the steps of:
supplying a first polymer film in tape form from a first supply roller;
supplying a second polymer film in tape form from a second supply roller;
forming a first inorganic material layer on the first polymer film supplied from the first supply roller;
forming a second inorganic material layer on the second polymer film supplied from the second supply roller;
surface-activating a surface of the first inorganic material layer by bombardment with particles having a predetermined kinetic energy;
surface-activating a surface of the second inorganic material layer by bombardment with particles having a predetermined kinetic energy;
bringing the surface of the surface-activated first inorganic material layer and the surface of the surface-activated second inorganic material layer into contact to bond the first polymer film and the second polymer film; and
winding a laminated polymer film formed by bonding the first polymer film and the second polymer film onto a winding roller,
wherein the first inorganic material layer and the second inorganic material layer are formed using silicon (Si) as a main component, and comprise iron.

11. The method of bonding a polymer film according to claim 10, wherein the step of bonding the first polymer film and the second polymer film is processed in a vacuum of $1 \times 10^{-5}$ Pa or less.

12. A method of bonding a polymer film to an inorganic material substrate, comprising the steps of:
forming a first inorganic material layer on part or all of a polymer film;
forming a second inorganic material layer on part or all of an inorganic material substrate;
surface-activating a surface of the first inorganic material layer by bombardment with particles having a predetermined kinetic energy;
surface-activating a surface of the second inorganic material layer by bombardment with particle having a predetermined kinetic energy; and
bringing the surface of the surface-activated first inorganic material layer and the surface of the surface-activated second inorganic material layer into contact to bond the polymer film and the inorganic material substrate,
wherein the first inorganic material layer and the second inorganic material layer are formed using silicon (Si) as a main component, and comprise iron.

13. The method of bonding a polymer film to an inorganic material substrate according to claim 12, wherein the step of bonding the polymer film and the inorganic material substrate is processed in a vacuum of $1 \times 10^{-5}$ Pa or less.

14. A polymer film laminate, comprising:
a first polymer film;
a second polymer film; and
an inorganic material layer disposed between part or all of the first polymer film and the second polymer film, and bonding the first polymer film and the second polymer film,
wherein the inorganic material layer is formed using silicon (Si) as a main component, and comprises iron.

15. The polymer film laminate according to claim 14, wherein the first polymer film and the second polymer film are formed using a polyimide resin or a polyester resin as a main component.

16. The polymer film laminate according to claim 14, wherein the inorganic material layer consists of layers of a plurality of materials.

17. The polymer film laminate according to claim 14, wherein the first polymer film and the second polymer film are bonded in a vacuum of $1 \times 10^{-5}$ Pa or less.

18. A laminate of a polymer film and an inorganic material substrate, comprising:
a polymer film;
an inorganic material substrate; and
a bonding layer of inorganic material disposed between part or all of the polymer film and the inorganic material substrate, and bonding the polymer film and the inorganic material substrate,
wherein the inorganic material layer is formed using silicon (Si) as a main component, and comprises iron.

19. The laminate of a polymer film and an inorganic material substrate according to claim 18, wherein the polymer film and the inorganic material substrate are bonded in a vacuum of $1 \times 10^{-5}$ Pa or less.

* * * * *